(12) United States Patent
Choi

(10) Patent No.: US 11,278,124 B2
(45) Date of Patent: Mar. 22, 2022

(54) CONNECTORS FOR COLLAPSIBLE BED FRAME AND COLLAPSIBLE BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 167 days.

(21) Appl. No.: 16/432,046

(22) Filed: Jun. 5, 2019

(65) Prior Publication Data

US 2019/0387890 A1 Dec. 26, 2019

(30) Foreign Application Priority Data

Jun. 21, 2018 (CN) .......................... 201810644617.5

(51) Int. Cl.
*A47C 19/12* (2006.01)
*A47C 19/02* (2006.01)
*F16B 12/56* (2006.01)

(52) U.S. Cl.
CPC .......... *A47C 19/126* (2013.01); *A47C 19/027* (2013.01); *F16B 12/56* (2013.01)

(58) Field of Classification Search
CPC ... E05D 7/043; E05D 2007/0453; E05D 3/06; A47C 19/126; A47C 19/027; A47C 19/025; A47C 19/122; A47C 19/14; A47C 19/02; A47C 19/021; A47C 19/005; A47C 19/04; F16B 12/56; F16B 12/44; F16B 12/40
See application file for complete search history.

(56) References Cited

U.S. PATENT DOCUMENTS

| | | |
|---|---|---|
| 273,332 A | 3/1883 | Woodin |
| 277,541 A | 5/1883 | Bowers |
| 372,913 A | 11/1887 | Hopkins |
| 557,997 A | 4/1896 | Nessel |
| 687,238 A | 11/1901 | Johnson |
| 705,384 A | 7/1902 | Cooper |
| 736,569 A | 8/1903 | Webb |
| 746,211 A | 12/1903 | Webb |
| 797,011 A | 8/1905 | Mosier |
| 984,823 A | 2/1911 | Linden |
| 1,072,550 A | 9/1913 | Wilson |
| 1,694,420 A | 12/1928 | Joselowitz |
| 1,760,955 A | 6/1930 | Moss |

(Continued)

FOREIGN PATENT DOCUMENTS

| | | | |
|---|---|---|---|
| DE | 102018130110 A1 | 5/2020 | |
| EP | 2182151 A2 * | 5/2010 | ........... E05D 7/0045 |

*Primary Examiner* — Robert G Santos
*Assistant Examiner* — Alison N Labarge
(74) *Attorney, Agent, or Firm* — Morgan. Lewis & Bockius LLP

(57) ABSTRACT

Disclosed are connectors and collapsible bed frames. A collapsible bed frame includes lateral and longitudinal bar units. Between each of two adjacent lateral bar units, a first longitudinal bar unit is disposed at a first side of the collapsible bed frame and a second longitudinal bar unit is disposed at a second side of the collapsible bed frame. The first and second longitudinal bar units and the two adjacent lateral bar units are rotatably connected with each other by connectors that enable the collapsible bed frame to contract and expand while the lateral and longitudinal bar units are connected with each other.

30 Claims, 13 Drawing Sheets

(56) References Cited

U.S. PATENT DOCUMENTS

| | | |
|---|---|---|
| 1,806,358 A | 5/1931 | Manly |
| 1,833,692 A | 11/1931 | Silvio |
| 2,057,334 A | 10/1936 | Hannum |
| 2,492,070 A | 12/1949 | Stone et al. |
| 2,584,491 A | 2/1952 | Ted |
| 2,602,012 A | 7/1952 | Doty |
| 2,680,252 A | 6/1954 | Hatton |
| 2,772,424 A | 12/1956 | Roche |
| 2,782,075 A | 2/1957 | Roscoe |
| 2,823,392 A | 2/1958 | Howard |
| 2,905,513 A | 9/1959 | Kane |
| 2,962,085 A | 11/1960 | Frank |
| 2,983,931 A | 5/1961 | Nelson |
| 3,185,499 A | 5/1965 | Reese |
| 3,245,363 A | 4/1966 | Kanitz |
| 3,296,983 A | 1/1967 | Brush |
| 3,504,877 A | 4/1970 | Lyon, Sr. |
| 3,605,142 A | 9/1971 | Weinhart |
| 3,613,132 A | 10/1971 | Weinhart |
| 3,657,748 A | 4/1972 | Weinhart |
| 3,984,884 A | 10/1976 | Spitz |
| 4,391,008 A | 7/1983 | Yamaoka |
| 4,431,164 A | 2/1984 | Jungo et al. |
| 4,745,644 A | 5/1988 | Pottschmidt |
| 4,788,727 A * | 12/1988 | Liu .................. A47C 19/005 5/174 |
| 4,974,526 A | 12/1990 | Wiygul, Jr. |
| 5,469,589 A | 11/1995 | Steed |
| 5,562,050 A | 10/1996 | Colquhoun |
| 5,884,566 A | 3/1999 | Chen |
| 5,943,968 A | 8/1999 | Dobson |
| 6,449,786 B1 | 9/2002 | Voit |
| 6,485,219 B1 | 11/2002 | Beyer |
| 7,003,822 B1 | 2/2006 | Sheehy |
| 7,376,986 B2 | 5/2008 | Smith |
| 7,690,316 B2 | 4/2010 | Yoo |
| 7,739,760 B2 | 6/2010 | Smith |
| 7,784,122 B2 | 8/2010 | Oh |
| RE41,763 E | 9/2010 | Ng |
| 7,845,030 B1 | 12/2010 | Pollard |
| 8,006,328 B2 | 8/2011 | Polevoy |
| 8,006,329 B2 | 8/2011 | Oh |
| 8,042,205 B2 | 10/2011 | Schulz, Jr. |
| 8,176,581 B2 | 5/2012 | Schulz, Jr. |
| 8,678,490 B2 | 3/2014 | Chen |
| 8,822,885 B2 | 9/2014 | Daneshvar |
| 8,832,876 B1 | 9/2014 | Oh |
| 8,935,819 B1 | 1/2015 | Hartley |
| 8,978,176 B1 | 3/2015 | Oh |
| 8,990,979 B1 | 3/2015 | Craver |
| 9,021,964 B2 | 5/2015 | Peng |
| 9,332,833 B2 | 5/2016 | Kim |
| 9,596,943 B1 | 3/2017 | Hartley |
| 9,924,804 B2 | 3/2018 | Hartley |
| 10,321,767 B2 | 6/2019 | Jin |
| 10,687,630 B1 | 6/2020 | Hartley |
| 10,702,070 B2 | 7/2020 | Oh |
| 10,959,529 B2 | 3/2021 | Choi |
| 10,959,530 B2 | 3/2021 | Choi |
| 10,966,537 B1 | 4/2021 | Denney |
| 2006/0107456 A1 * | 5/2006 | Joseph .................. A47C 17/58 5/2.1 |
| 2008/0109958 A1 | 5/2008 | Wang |
| 2009/0025143 A1 * | 1/2009 | Oh .................. A47C 19/005 5/201 |
| 2010/0170190 A1 | 7/2010 | Schulz, Jr. |
| 2010/0171342 A1 | 7/2010 | Chen |
| 2010/0235989 A1 | 9/2010 | Jin |
| 2010/0275372 A1 | 11/2010 | Oh |
| 2010/0299831 A1 | 12/2010 | Lee |
| 2011/0258777 A1 | 10/2011 | Schulz, Jr. |
| 2012/0204770 A1 | 8/2012 | Grace |
| 2012/0304380 A1 * | 12/2012 | Jin .................. A47C 19/126 5/400 |
| 2013/0000038 A1 | 1/2013 | Schulz, Jr. |
| 2013/0025051 A1 | 1/2013 | Syrowitz |
| 2014/0208506 A1 | 7/2014 | Bartelsmeyer |
| 2016/0143446 A1 | 5/2016 | Hartley |
| 2016/0255963 A1 | 9/2016 | Jones |
| 2016/0296004 A1 | 10/2016 | Peng |
| 2018/0042391 A1 | 2/2018 | Oh |
| 2018/0055235 A1 | 3/2018 | Choi |
| 2018/0116412 A1 | 5/2018 | Jin |
| 2018/0140103 A1 | 5/2018 | Thompson |
| 2019/0387888 A1 | 12/2019 | Choi |
| 2019/0387889 A1 | 12/2019 | Choi |
| 2019/0387890 A1 | 12/2019 | Choi |
| 2019/0387891 A1 | 12/2019 | Choi |
| 2019/0387892 A1 | 12/2019 | Choi |
| 2019/0387893 A1 | 12/2019 | Choi |
| 2020/0022501 A1 | 1/2020 | Choi |
| 2020/0022502 A1 | 1/2020 | Choi |
| 2020/0022503 A1 | 1/2020 | Choi |
| 2020/0146438 A1 | 5/2020 | Choi |
| 2020/0378426 A1 | 12/2020 | Choi |

* cited by examiner

CONNECTORS FOR COLLAPSIBLE BED FRAME AND COLLAPSIBLE BED FRAME HAVING SAME

CROSS-REFERENCE TO RELATED APPLICATIONS

The present application claims priority to Chinese Utility Model Application CN 201810644617.5 filed Jun. 21, 2018. The disclosure of the application is incorporated herein for all purposes by reference in its entirety.

FIELD OF THE INVENTION

The present invention generally relates to bed frames and beds, and more particularly, to connectors, collapsible bed frames and beds having collapsible bed frames.

BACKGROUND

Many existing foldable bed frames are not user-friendly. For instance, existing bed frames are usually shipped with most of the components disassembled to save space and reduce cost. To use such a bed frame, one needs to assemble it first. This often involves connecting a number of lateral and longitudinal bars by screws, bolts or other connectors. Conversely, to fold such a bed frame, one needs to remove those connectors and disassemble the lateral and longitudinal bars. Assembling and disassembling the bed frame not only takes time and energy, but also requires tools such as screwdrivers and wrenches available every time when assembling or disassembling is desired. Moreover, disassembled parts, in particular those screws, bolts or other connectors, have to be stored carefully so that they would not get lost. Otherwise, the bed frame may not be assembled properly for next use.

Given the current state of the art, there remains a need for collapsible beds and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides connectors, collapsible bed frames and beds having such collapsible bed frames.

In various embodiments, the present invention provides a collapsible bed frame including a plurality of lateral bar units, a plurality of first longitudinal bar units and a plurality of second longitudinal bar units. Each bar of the plurality of lateral bar units is arranged substantially parallel to another. The plurality of lateral bar units includes a first outer lateral bar unit, a second outer lateral bar unit, and at least one inner lateral bar unit disposed between the first and second outer lateral bar units. Each lateral bar unit in the plurality of lateral bar units has a first end and a second end. Between each of two adjacent lateral bar units, a first longitudinal bar unit in the plurality of first longitudinal bar units is disposed at a first side of the collapsible bed frame and rotatably connected with the first ends of the two adjacent lateral bar units, and a second longitudinal bar unit in the plurality of second longitudinal bar units is disposed at a second side of the collapsible bed frame and rotatably connected with the second ends of the two adjacent lateral bar units. The collapsible bed frame also includes a plurality of first connectors, each including a first body and a first coupler rotatable with respect to the first body. The first body is connected with the first or second end of a respective outer lateral bar unit in the first and second outer lateral bar units, and the first coupler is connected with an end of a corresponding first or second longitudinal bar unit. One or more receptacles are formed or disposed at each bar unit in the plurality of lateral bar units, the plurality of first longitudinal bar units, and the plurality of second longitudinal bar units and configured to removably receive one or more supporting bar units.

In various embodiments, between the respective outer lateral bar unit and its adjacent inner lateral bar unit, each of the first and second longitudinal bar units includes a first longitudinal segment unit and a second longitudinal segment unit rotatably connected with each other at one end thereof. The other end of the first longitudinal segment unit is connected with the first coupler of the corresponding first connector at the respective outer lateral bar unit, and the other end of the second longitudinal segment unit is connected with the adjacent inner lateral bar unit.

In some embodiments, the first body has a substantially cylindrical shape, and the first coupler includes a first part rotatably coupled with the first body and a second part connected with the other end of the first longitudinal segment unit.

In some embodiments, the first part is formed with a first through-hole. The first part of the first coupler is coupled with the first body by a first fastener through the first through-hole.

In some embodiments, the second part of the first coupler is formed with a second through-hole configured to couple with the other end of the first or second longitudinal segment unit.

In various embodiments, each bar unit in the plurality of lateral bar units, the plurality of first longitudinal bar units, and the plurality of second longitudinal bar units includes an upper bar and a lower bar The upper bars of the plurality of lateral bar units, the plurality of first longitudinal bar units, and the plurality of second longitudinal bar units collectively form an upper frame of the collapsible bed frame. The lower bars of the plurality of lateral bar units, the plurality of first longitudinal bar units, and the plurality of second longitudinal bar units collectively form a lower frame of the collapsible bed frame.

In some embodiments, the first coupler includes a first upper coupler disposed at an upper portion of the first body and a first lower coupler disposed at a lower portion of the first body. The first upper coupler is connected with the upper bar of the corresponding first or second longitudinal bar unit, and the first lower coupler is connected with the lower bar of the corresponding first or second longitudinal bar unit.

In some embodiments, the first lower coupler includes a protrusion facing downwardly with respect to the collapsible bed frame when the collapsible bed frame is in an expanded state.

In some embodiments, the first upper and lower couplers are coupled with the first body by one or more fasteners.

In some embodiments, the collapsible bed frame further includes a plurality of vertical supporting bars disposed between the upper and lower frames, each having an upper end connected with the upper frame and a lower end connected with the lower frame.

In various embodiments, the present invention provides a collapsible bed frame including a plurality of lateral bar units, a plurality of first longitudinal bar units and a plurality of second longitudinal bar units. Each bar in the plurality of lateral bar units is arranged substantially parallel to another. The plurality of lateral bar units includes a first outer lateral bar unit, a second outer lateral bar unit, and at least one inner lateral bar unit disposed between the first and second outer lateral bar units. Each lateral bar unit in the plurality of lateral bar units has a first end and a second end. Between each of two adjacent lateral bar units, a first longitudinal bar unit in the plurality of first longitudinal bar units is disposed at a first side of the collapsible bed frame, and a second longitudinal bar unit in the plurality of second longitudinal bar units is disposed at a second side of the collapsible bed frame. The collapsible bed frame also includes a plurality of first connectors and a plurality of second connectors. Each first connector includes a first body and a first coupler rotatable with respect to the first body. The first body is connected with the first or second end of a respective outer lateral bar unit in the first and second outer lateral bar units, and the first coupler is connected with an end of an adjacent longitudinal bar unit in the plurality of first and second longitudinal bar units. Each second connector is connected with the first or second end of a respective inner lateral bar unit in the at least one inner lateral bar unit and connected with ends of two adjacent longitudinal bar units in the plurality of first longitudinal bar units or in the plurality of second longitudinal bar units.

In some embodiments, between the respective outer lateral bar unit and its adjacent inner lateral bar unit, each of the first and second longitudinal bar units includes a first longitudinal segment unit and a second longitudinal segment unit rotatably connected with each other at one ends thereof. The other end of the first longitudinal segment unit is connected with the first coupler of the corresponding first connector at the respective outer lateral bar unit, and the other end of the second longitudinal segment unit is connected with the adjacent inner lateral bar unit.

In some embodiments, the first and second longitudinal segment units are rotatable connected with each other by a third connector.

In some embodiments, each of the first and second longitudinal segment units includes an upper bar segment and a lower bar segment. The third connector includes a third upper connector to connect the upper bar segments of the first and second longitudinal segment units and a third lower connector to connect the lower bar segments of the first and second longitudinal segment units.

In various embodiments, each second connector includes first, second and third pieces. The first piece is fixedly coupled with the first or second end of the respective inner lateral bar unit. The second piece is extended from an upper edge of the first piece and substantially perpendicular to the first piece. The third piece is extended from a lower edge of the first piece and substantially perpendicular to the first piece. The ends of the two adjacent first or second longitudinal bar units are disposed between the second and third pieces and rotatably connected with the second and third pieces. One of the two adjacent longitudinal bar units is rotatable along a first axis, and the other of the two adjacent longitudinal bar units is rotatable along a second axis. The first piece is shorter than the second and third pieces in a longitudinal direction of the collapsible bed frame. The first and second axes are located beyond the first piece in the longitudinal direction of the collapsible bed frame, thereby allowing the two adjacent longitudinal bar units to rotate toward the respective inner lateral bar unit.

In some embodiments, the first piece is formed with a through-hole to receive the first or second end of the respective inner lateral bar unit.

In various embodiments, each bar unit in the plurality of lateral bar units, the plurality of first longitudinal bar units, and the plurality of second longitudinal bar units includes an upper bar and a lower bar. The upper bars of the plurality of lateral bar units, the plurality of first longitudinal bar units, and the plurality of second longitudinal bar units collectively form an upper frame of the collapsible bed frame. The lower bars of the plurality of lateral bar units, the plurality of first longitudinal bar units, and the plurality of second longitudinal bar units collectively form a lower frame of the collapsible bed frame.

In some embodiments, the first coupler includes a first upper coupler disposed at an upper portion of the first body and a first lower coupler disposed at a lower portion of the first body. The first upper coupler is connected with the upper bar of the corresponding first or second longitudinal bar unit, and the first lower coupler is connected with the lower bar of the corresponding first or second longitudinal bar unit.

In some embodiments, the first lower coupler includes a protrusion facing downwardly with respect to the collapsible bed frame when the collapsible bed frame is in an expanded state.

In some embodiments, each second connector includes a second upper connector for connecting upper bars and a second lower connector for connecting lower bars. Each of the second upper and lower connectors includes first, second and third pieces. The first piece is fixedly coupled with the first or second end of the lower or upper bar of the respective inner lateral bar unit. The second piece is extended from an upper edge of the first piece and substantially perpendicular to the first piece. The third piece is extended from a lower edge of the first piece and substantially perpendicular to the first piece. The ends of the lower or upper bars of the two adjacent first or second longitudinal bar units are disposed between the second and third pieces and rotatably connected with the second and third pieces. One of the two adjacent longitudinal bar units is rotatable along a first axis, and the other of the two adjacent longitudinal bar units is rotatable along a second axis. The first piece has a length shorter than the second and third pieces in a longitudinal direction of the collapsible bed frame. The first and second axes are located beyond the first piece in the longitudinal direction of the collapsible bed frame, thereby allowing the two adjacent longitudinal bar units to rotate toward the respective inner lateral bar unit.

The connectors, bed frames and beds of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

Figure 1:
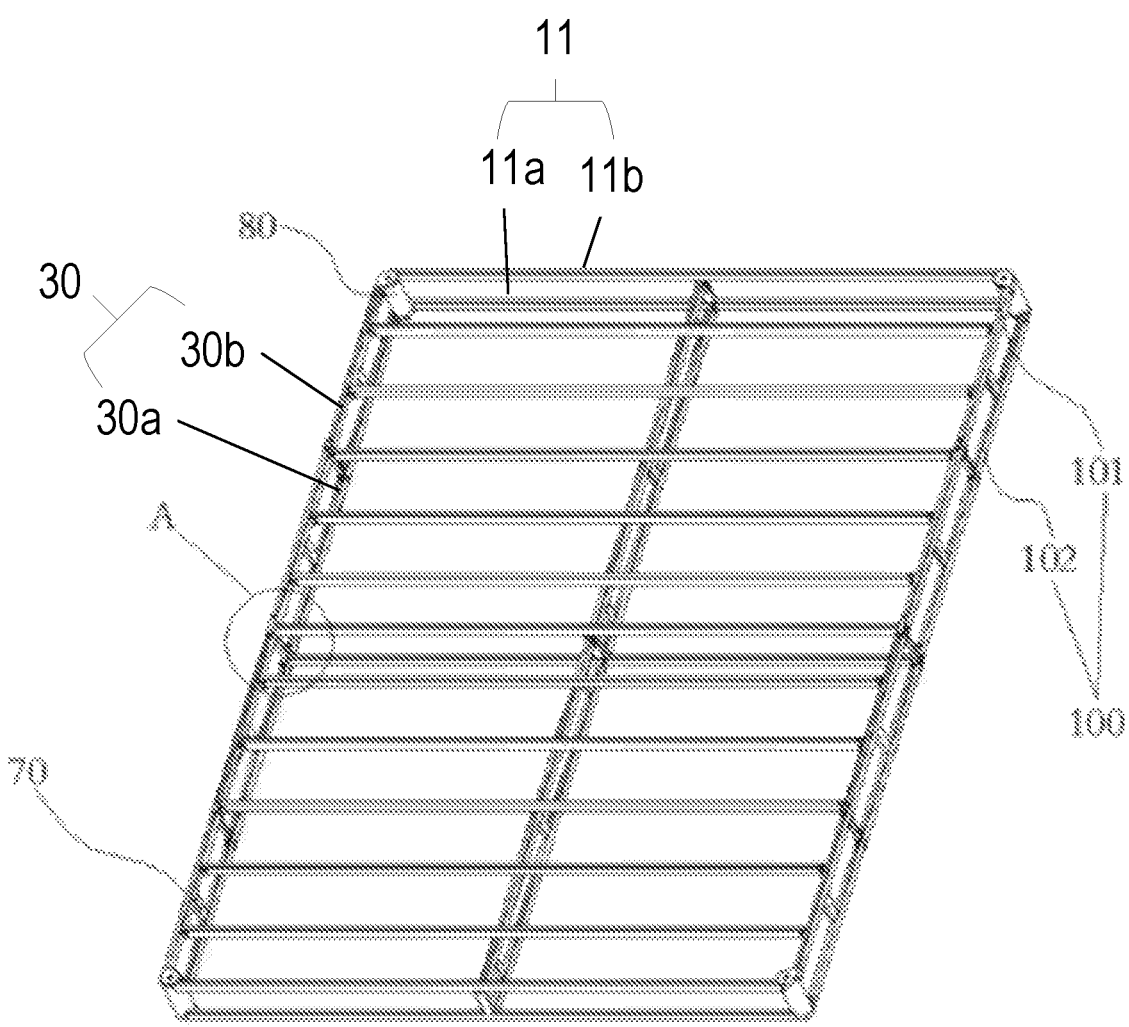
FIG. 1 is a perspective view illustrating an exemplary bed frame in an expanded state in accordance with exemplary embodiments of the present invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of exemplary collapsible bed frames and exemplary beds having one or more such collapsible bed frames. The collapsible beds and bed frames of the present invention can be of various sizes including but not limited to twin, full, queen and king sizes, and of various shapes including but not limited to rectangles and squares. They can be made of various materials including but not limited to metals such as steel, plastics and woods.

In general, a collapsible bed frame of the present invention includes a plurality of lateral bar units, a plurality of first longitudinal bar units and a plurality of second longitudinal bar units. The plurality of lateral units is disposed in a lateral direction of the bed frame and arranged substantially parallel to each other. The plurality of first longitudinal bar units is disposed at a first side of the bed frame, and the plurality of second longitudinal bar units is disposed at a second side of the bed frame. Among the lateral and longitudinal bar units, adjacent bar units are rotatably connected with each other such that the bed frame of the present invention can contract and expand with no need to disconnect the lateral and longitudinal bar units.

Figure 2:
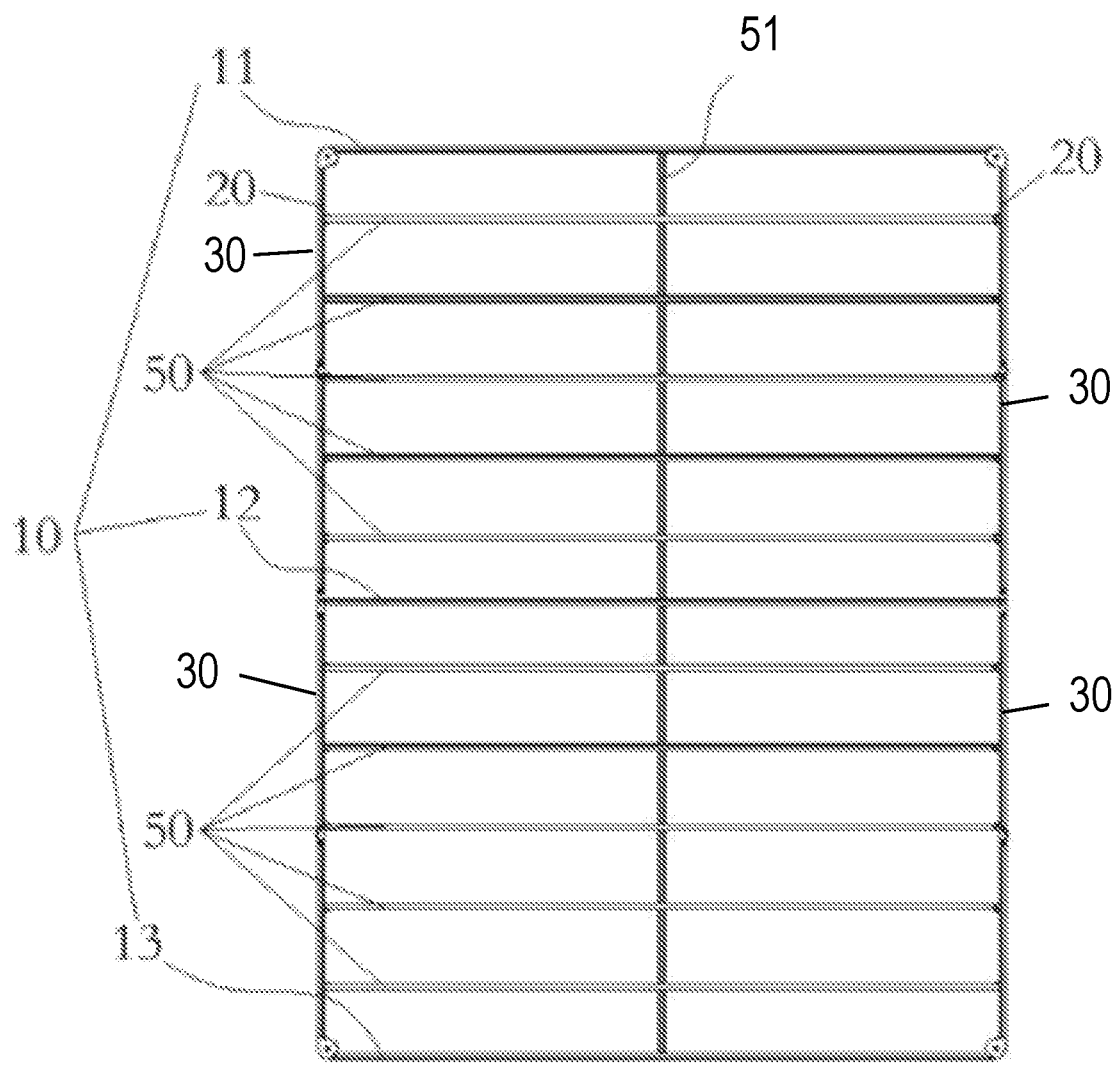
FIG. 2 is a top view illustrating an exemplary bed frame in an expanded state in accordance with exemplary embodiments of the present invention.

In various embodiments, the plurality of lateral bar units includes a first outer lateral bar unit, a second outer lateral bar unit, and at least one inner lateral bar unit disposed between the first and second outer lateral bar units. In some embodiments, there is one single inner lateral bar unit, and in some other embodiments, there are two, three or more inner lateral bar units. By way of example, FIG. 2 illustrates a collapsible bed frame including a plurality of lateral bar units indicated by reference numeral 10. The plurality of lateral bar units includes first outer lateral bar unit 11, second outer lateral bar unit 13, and inner lateral bar unit 12 disposed between first outer lateral bar unit 11 and second outer lateral bar unit 13.

Between each of two adjacent lateral bar units, a first longitudinal bar unit in the plurality of first longitudinal bar units is disposed at a first side of the collapsible bed frame and rotatably connected with the first ends of the two adjacent lateral bar units. Also, a second longitudinal bar unit in the plurality of second longitudinal bar units is disposed at a second side of the collapsible bed frame and rotatably connected with the second ends of the two adjacent lateral bar units. It should be noted that the first longitudinal bar unit can be the same as or different from the second longitudinal bar unit. It should also be noted that any two of first longitudinal bar units can be the same as or different from each other. Similarly, any two of second longitudinal bar units can be the same as or different from each other.

By way of example, FIG. 2 illustrates a plurality of first longitudinal bar units (indicated by reference numeral 20) disposed at a first side of the collapsible bed frame (e.g., left side in the figure), and a plurality of second longitudinal bar units (indicated by reference numeral 20) disposed at a second side of the collapsible bed frame (e.g., right side in the figure). In the illustrated embodiment, two first longitudinal bar units 30 are disposed at the first side and two second longitudinal bar units 30 at the second side of the collapsible bed frame. One of the two first longitudinal bar units is disposed between first outer lateral bar unit 11 and inner lateral bar unit 12 and rotatably connected with the first ends (e.g., left ends) of the first outer lateral bar unit and inner lateral bar unit. The other of the two first longitudinal bar units is disposed between inner lateral bar unit 12 and second outer lateral bar unit 13 and rotatably connected with the first ends (e.g., left ends) of the inner lateral bar unit and second outer lateral bar unit. Similarly, one of the two second longitudinal bar units is disposed between first outer lateral bar unit 11 and inner lateral bar unit 12 and rotatably connected with the second ends (e.g., right ends) of the first outer lateral bar unit and inner lateral bar unit. The other of the two second longitudinal bar units is disposed between inner lateral bar unit 12 and second outer lateral bar unit 13 and rotatably connected with the second ends (e.g., right ends) of the inner lateral bar unit and second outer lateral bar unit.

Figure 3:
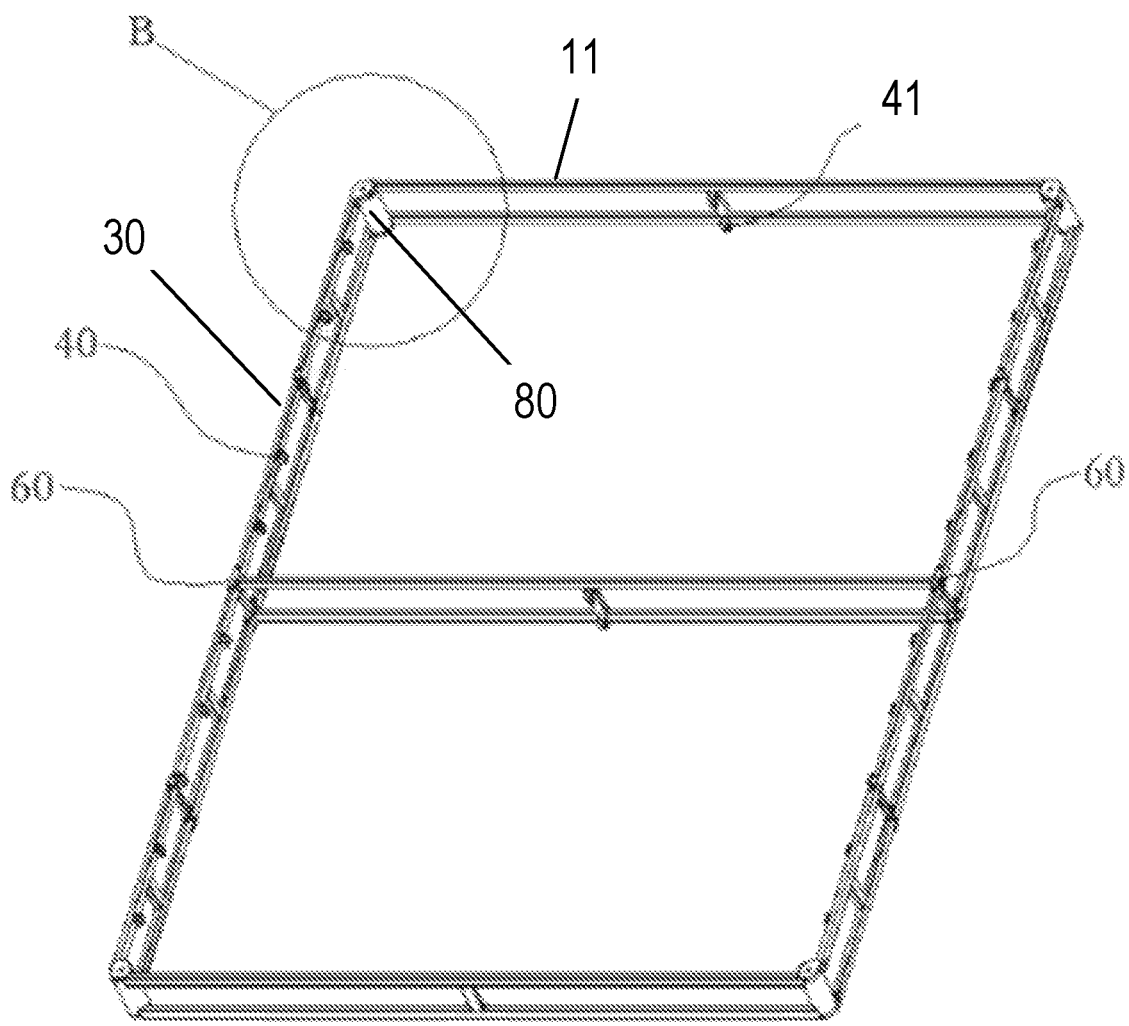
FIG. 3 is a perspective view illustrating an exemplary bed frame in an expanded state in accordance with exemplary embodiments of the present invention.
Figure 4:
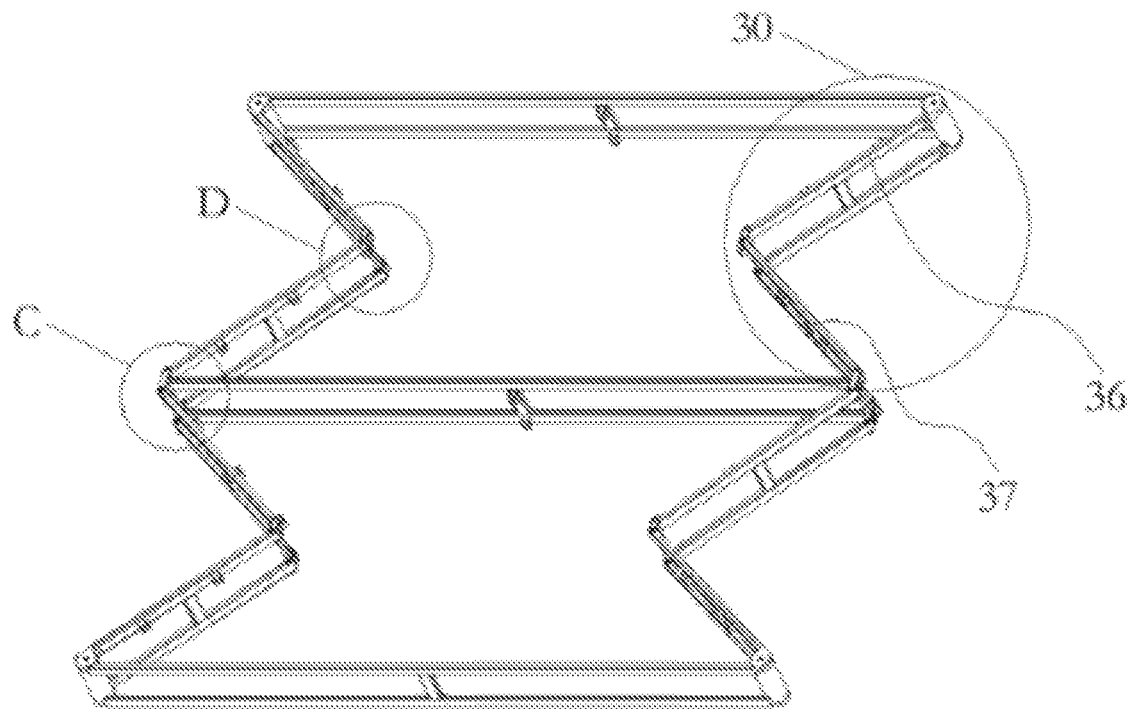
FIG. 4 is a perspective view illustrating an exemplary bed frame in an intermediate state in accordance with exemplary embodiments of the present invention.
Figure 5:
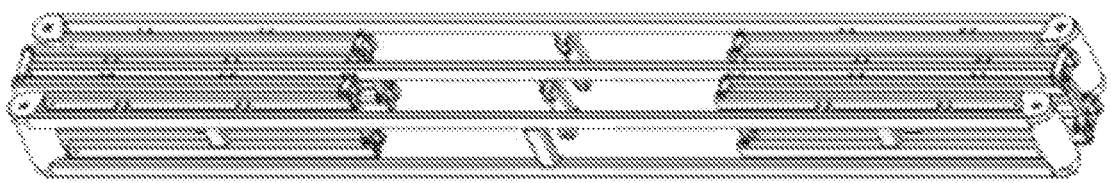
FIG. 5 is a perspective view illustrating an exemplary bed frame in a contracted state in accordance with exemplary embodiments of the present invention.

In various embodiments, a longitudinal bar unit is made of two or more longitudinal segment units rotatably connected with each other. In some embodiments, each of the first and second longitudinal bar units is made of two or more longitudinal segment units rotatably connected with each other. It should be noted that the two or more longitudinal segment units can be the same as or different frame each other, for instance, having different lengths. By way of example, FIG. 4 illustrates longitudinal bar unit 30 made of two longitudinal segment units, e.g., first longitudinal segment unit 36 and second longitudinal segment unit 37. The first and second longitudinal segment units are rotatably connected with each other at their proximal ends. As such, during contraction, the first and second segment units retreat into an interior space defined by the collapsible bed frame when it is fully expanded. This allows the bed frame to contract from an expanded state as illustrated in FIG. 3 to an intermediate state as illustrated in FIG. 4 and then to a contracted state as illustrated in FIG. 5. As shown, the size of the bed frame in the contracted state is reduced significantly. Moreover, this contraction process is reversible. For instance, it allows the bed frame to expand from the contracted state as illustrated in FIG. 5, through the intermediate state as illustrated in FIG. 4, to the expanded state as illustrated in FIG. 3. Further, the contraction and expansion of the bed frame are performed while the lateral bar units and the first and second longitudinal bar units are connected with each other. There is no need to disconnect or disassemble these parts.

A lateral or longitudinal bar unit of the present invention can include a single bar or a stack of bars. As used herein, an exemplary stack of bars refers to two, three or more bars arranged one over another, e.g., in a vertical direction when the bed frame is expanded and placed on the ground. The two, three or more bars can be but not necessarily must be in direct contact. For instance, a bar unit can include a lower bar, an upper bar above the lower bar, and/or vertical support(s) in between. By way of example, FIG. 1 illustrates first outer lateral bar unit 11 including lower lateral bar 11a and upper lateral bar 11b, and longitudinal bar unit 30 including lower longitudinal bar 30a and upper longitudinal bar 30b. In some embodiments, a lateral or longitudinal bar unit of the present invention includes one or more vertical supports disposed between the upper and lower bars to support the upper bar. For instance, FIG. 1 illustrates one or more vertical supports 70 disposed between lower longitudinal bar 30a and upper longitudinal bar 30b to support upper longitudinal bar 30b. Vertical supports 70 enhances the strength of the bed frame.

In various embodiments, the upper bars of the lateral bar units, first longitudinal bar units, and second longitudinal bar units collectively form an upper frame of the collapsible bed frame such as upper frame 101. Similar, the lower bars of the plurality of lateral bar units, first longitudinal bar units, and second longitudinal bar units collectively form a lower frame of the collapsible bed frame, such as lower frame 102. Together, the upper and lower frames are referred to as a frame unit such as frame unit 100. It should be noted that a frame unit can include of a single frame, or a stack of frames that includes two, three or more frames arranged one over another. Generally, a stack of frames is stronger than a single frame. A stack of frames also increases the height of the collapsible bed frame.

In various embodiments, receptacles are formed or disposed at some bar units. In some embodiments, at least one receptacle is formed or disposed at each bar unit in the plurality of lateral bar units, the plurality of first longitudinal bar units, and the plurality of second longitudinal bar units. Receptacles are configured to facilitate easy installation of lateral and/or longitudinal supporting bar units for supporting a mattress or the like, and to facilitate easy removal of the supporting bar units out before contracting the bed frame.

By way of example, FIG. 3 illustrates a plurality of receptacles 40 formed or disposed at longitudinal bar unit 30, and one or more receptacles 41 formed or disposed at an lateral bar unit such as first outer lateral bar unit 11. Receptacle 40 is configured to removably receive an end of lateral supporting bar unit 50 and receptacle 41 is configured to removably receive an end of longitudinal supporting bar unit 51 as illustrated in FIG. 2. In some embodiments, each lateral supporting bar unit 50 is a single supporting bar.

Receptacle 40 and receptacle 41 can be substantially the same as or different from each other. In some embodiments, receptacle 40 is disposed at upper bar 30b of a longitudinal bar unit, and receptacle 41 is disposed at vertical support 70 that is between the upper and lower bars of a lateral bar unit (e.g., first outer lateral bar 11). As such, longitudinal supporting unit 51 can be placed below lateral supporting bar unit 50. Lateral supporting bar unit 50 can be leveled with upper frame 101 and supported by longitudinal supporting unit 51. The resulted bed frame is more comfortable and more stable.

In various embodiments, a collapsible bed frame of the present invention includes a plurality of first connectors configured to connect the outer lateral bar units with the first and second longitudinal bar units. It should be noted that any two of the first connectors can be the same as or different from each other. In some embodiments, each first connector is configured to connect one end (e.g., the first or second end) of an outer lateral bar unit (e.g., first outer lateral bar unit 11 or second outer lateral bar unit 13) with one end of an adjacent longitudinal bar unit. In some embodiments, a first connector includes a body and a coupler rotatable with respect to the body. The body is connected or fixedly connected with the end of the outer lateral bar unit. The coupler is connected or fixedly connected with the end of the adjacent longitudinal bar unit.

Figure 6:
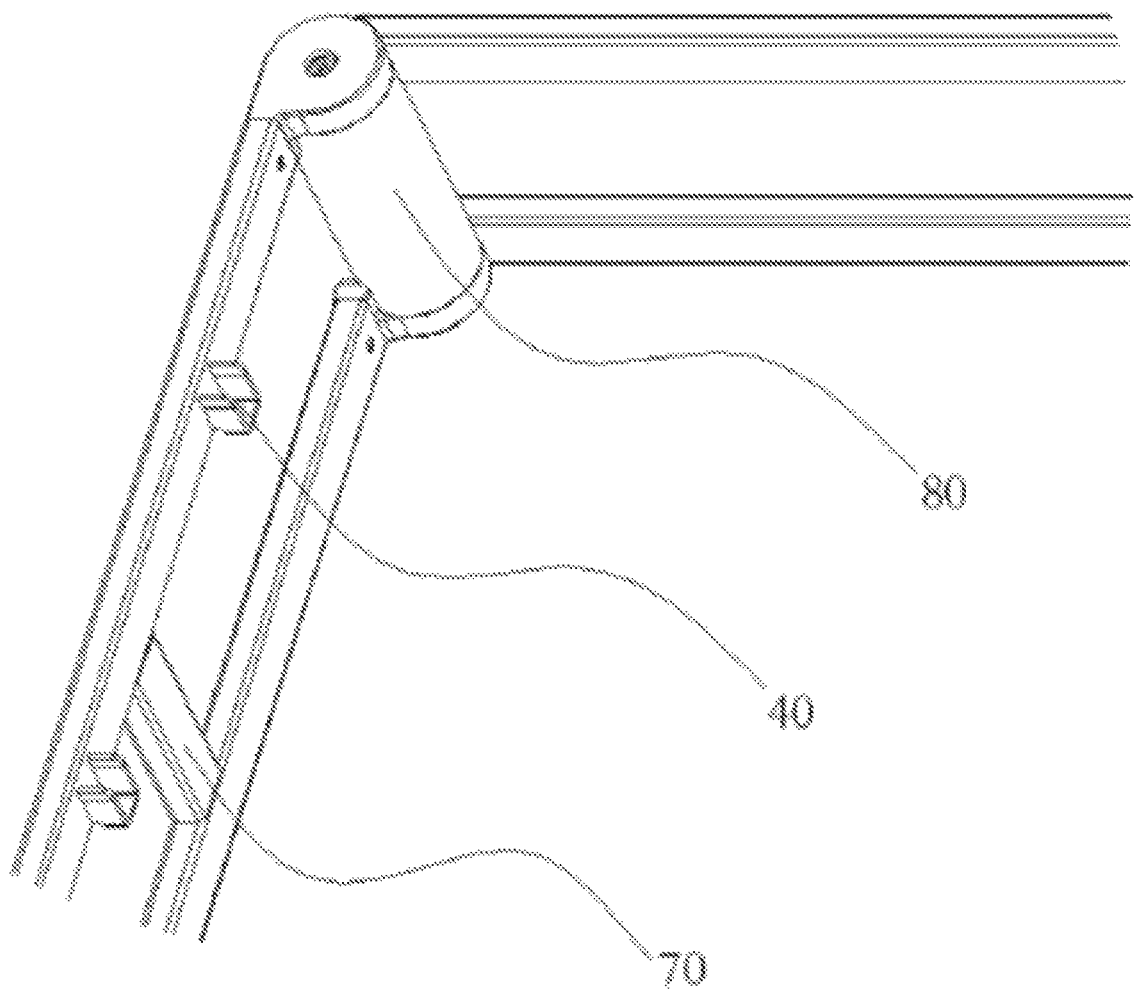
FIG. 6 is an enlarged view taken along circle B of FIG. 3.
Figure 7:
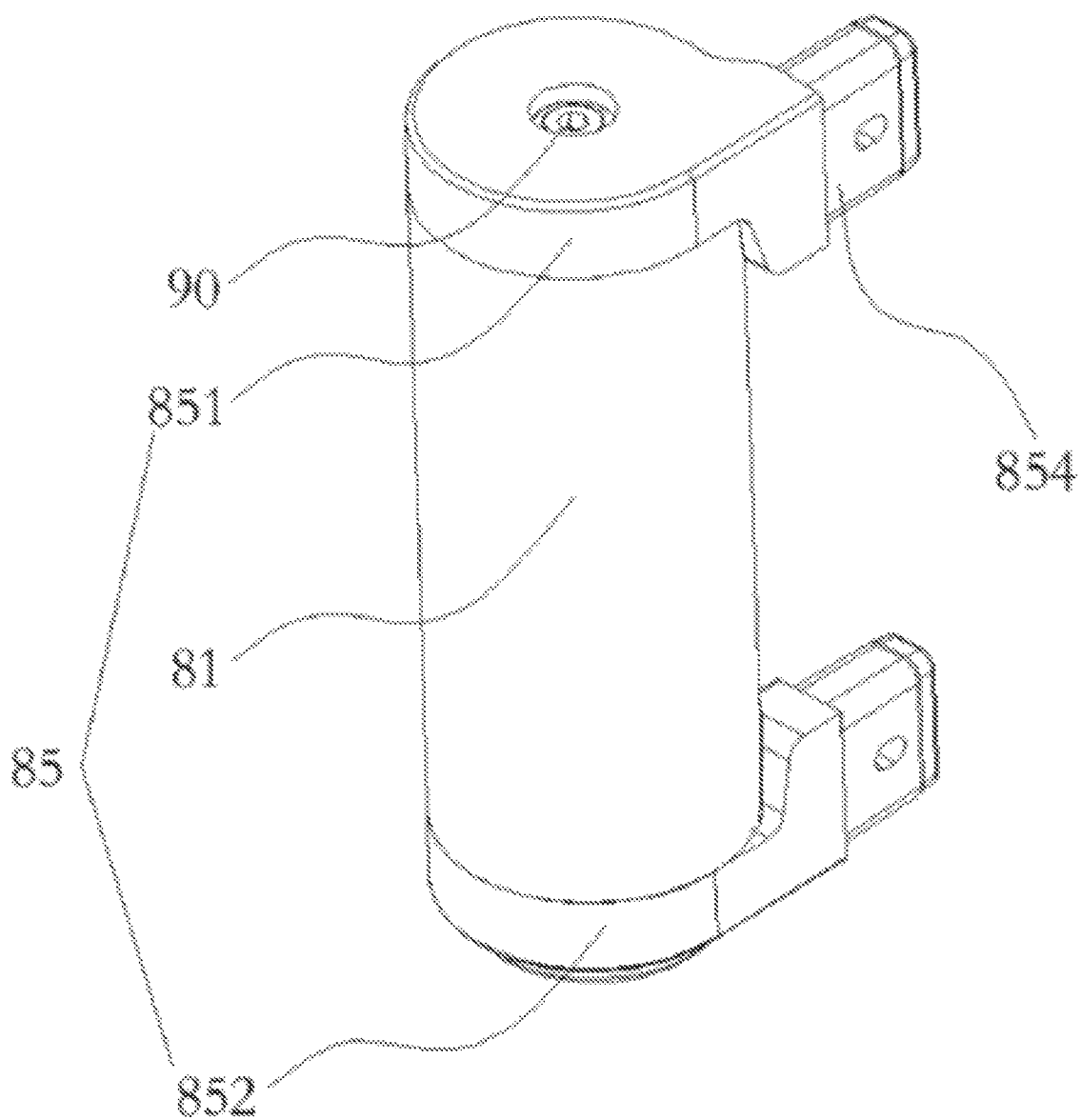
FIG. 7 is a perspective view illustrating an exemplary first connector in accordance with exemplary embodiments of the present invention.

By way of example, FIG. 3 illustrates a bed frame including first connector 80 to connect an end (e.g. the first or second end) of an outer lateral bar unit (e.g., the outer lateral bar unit 11 or second outer lateral bar unit 13) with an end of adjacent longitudinal bar unit 30. FIGS. 6 and 7 illustrate first connector 80 including first body 81 configured to connect or fixedly connect with the end of the outer lateral bar unit. In some embodiments, first body 81 has a substantially cylindrical shape.

First connector 80 also includes first coupler 85 disposed at first body 81 and rotatable with respect to first body 81. First coupler 85 is configured to connect or fixedly connect with the end of adjacent longitudinal bar unit 30. First coupler 85 can be a single coupler or a stack of couplers. In some embodiments such as those where adjacent longitudinal bar unit 30 is a stack of bars that includes two or more bars, first coupler 85 itself can include two or more couplers, each for coupling with an end of one bar in the stack. By way of example, FIGS. 6 and 7 illustrate first coupler 85 including first upper coupler 851 and first lower coupler 852. First upper coupler 851 is disposed at an upper portion of the first body and configured to couple with an upper longitudinal bar, e.g., upper longitudinal bar 30*b* of adjacent longitudinal bar unit 30. First lower coupler 852 is disposed at a lower portion of the first body and configured to couple with a lower longitudinal bar, e.g., lower longitudinal bar 30*a* of adjacent longitudinal bar unit 30. The first lower and upper couplers allow the lower and upper frames to contact and expand simultaneously.

Figure 9:
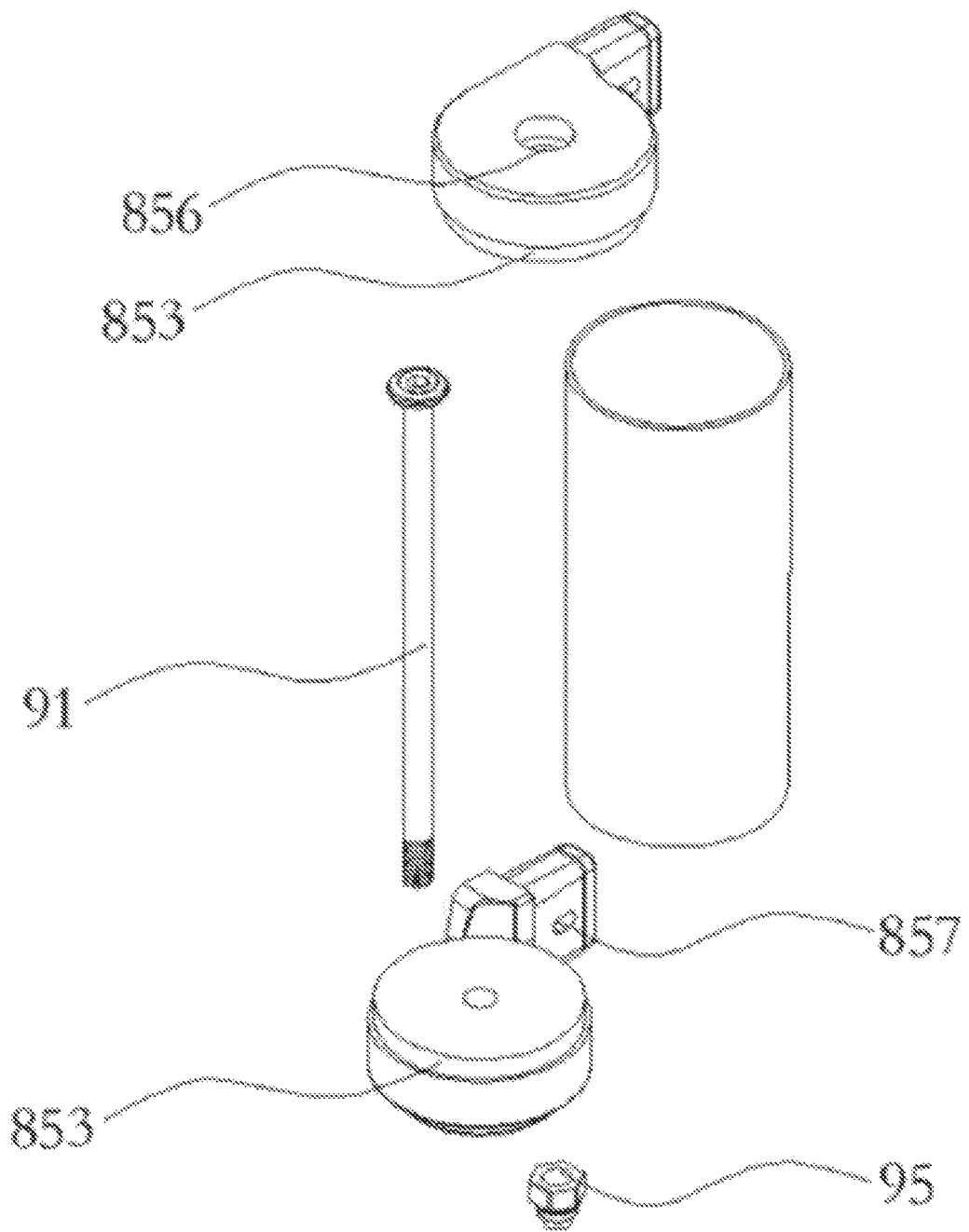
FIG. 9 is a perspective and disassembled view illustrating an exemplary first connector in accordance with exemplary embodiments of the present invention.

In some embodiments, the first coupler includes a first part rotatably coupled with the first body and a second part connected with the end of the adjacent longitudinal bar unit. By way of example, FIGS. 7 and 9 illustrate each of first upper coupler 851 and first lower coupler 852 includes first part 853 and second part 854.

First part 853 is configured to rotatably couple with first body 81. In some embodiments, at least a portion of first part 853 has an outer diameter that is slightly smaller than the inner diameter of first body 81 so that first upper coupler 851 and first lower coupler 852 can rotate with respect to first body 81.

Figure 10:
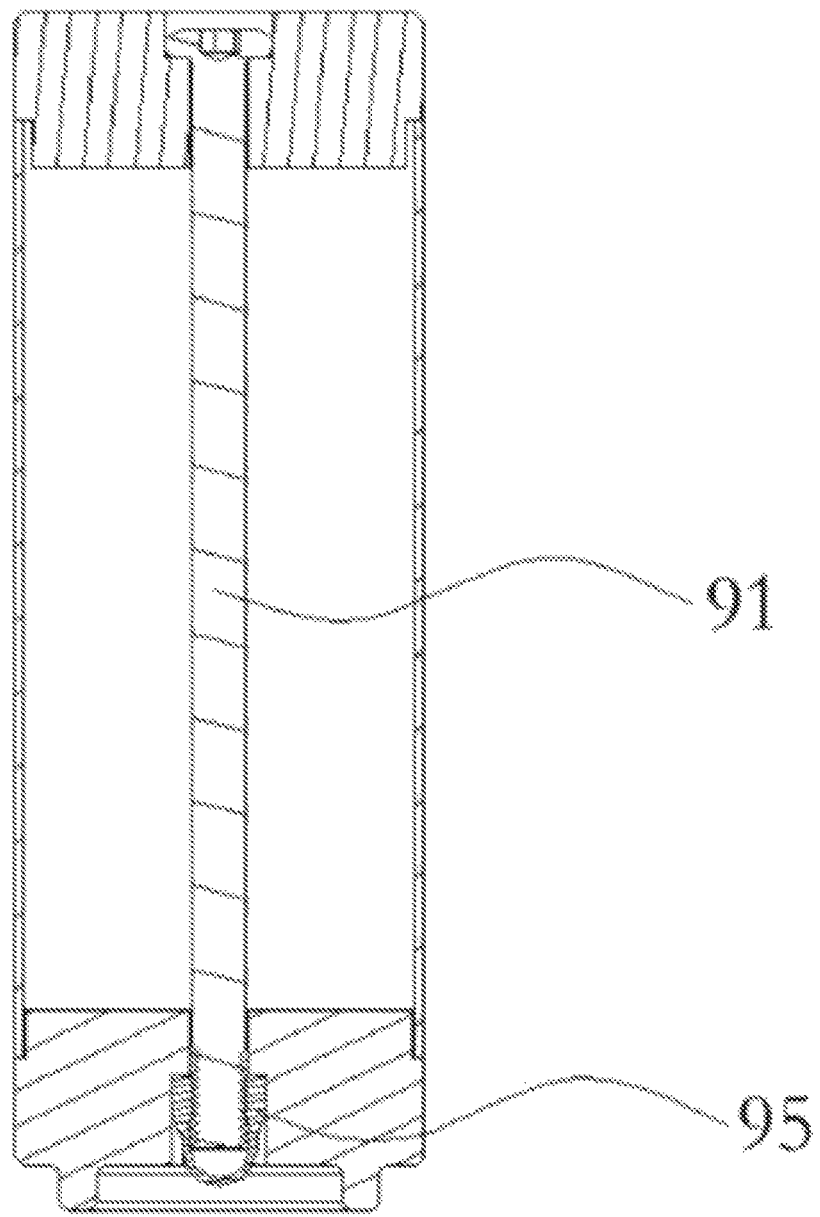
FIG. 10 is a cross-sectional view illustrating an exemplary first connector in accordance with exemplary embodiments of the present invention.
Figure 11:
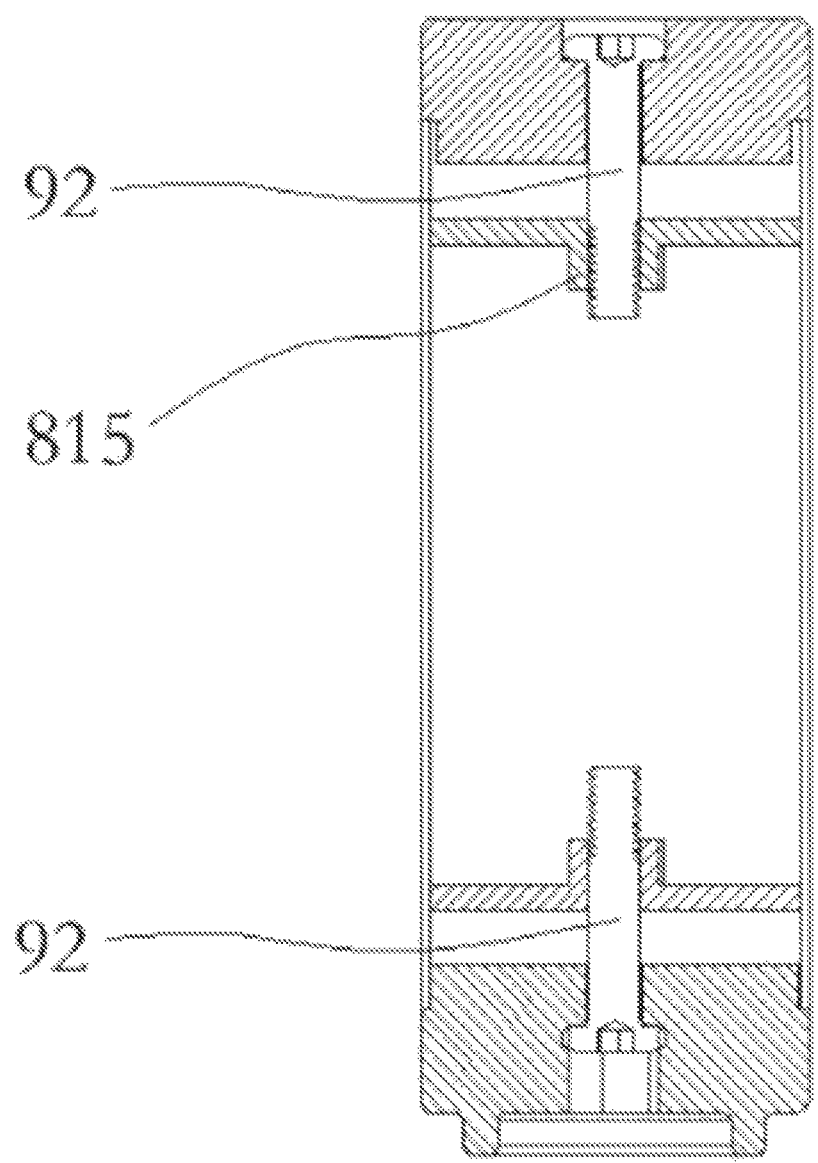
FIG. 11 is a cross-sectional view illustrating an exemplary alternative first connector in accordance with exemplary embodiments of the present invention.

In some embodiments, first part 853 is formed with a through-hole such as first through-hole 856 for coupling with the first body. For instance, first coupler 85 (e.g., first upper coupler 851 and first lower coupler 852) can be coupled with first body 81 by a first fastener, e.g., fastener 90 in FIG. 7. In an embodiment, first fastener 90 includes a relatively longer bolt and a matching nut such as bolt 91 and nut 95 as illustrated in FIGS. 9 and 10. In an alternative embodiment, first fastener 90 includes two relative shorter bolt and two matching nuts such as bolt 92 and matching nut 815 as illustrated in FIG. 11. One pair of bolt 92 and matching nut 815 couples first upper coupler 851 with first body 81, and another pair of bolt 92 and matching nut 815 couples first lower coupler 852 with first body 81.

Second part 854 is configured to connect with the end of the adjacent longitudinal bar unit. In some embodiments, second part 854 is formed with a second through-hole, such as through-hole 857 as illustrated in FIG. 9, to couple with the end of the upper or lower longitudinal bar of adjacent longitudinal bar unit 30. In an embodiment, the end of the upper or lower longitudinal bas of adjacent longitudinal bar unit 30 is inserted into second part 854, and then fastened by a fastener through the second through-hole.

Figure 8:
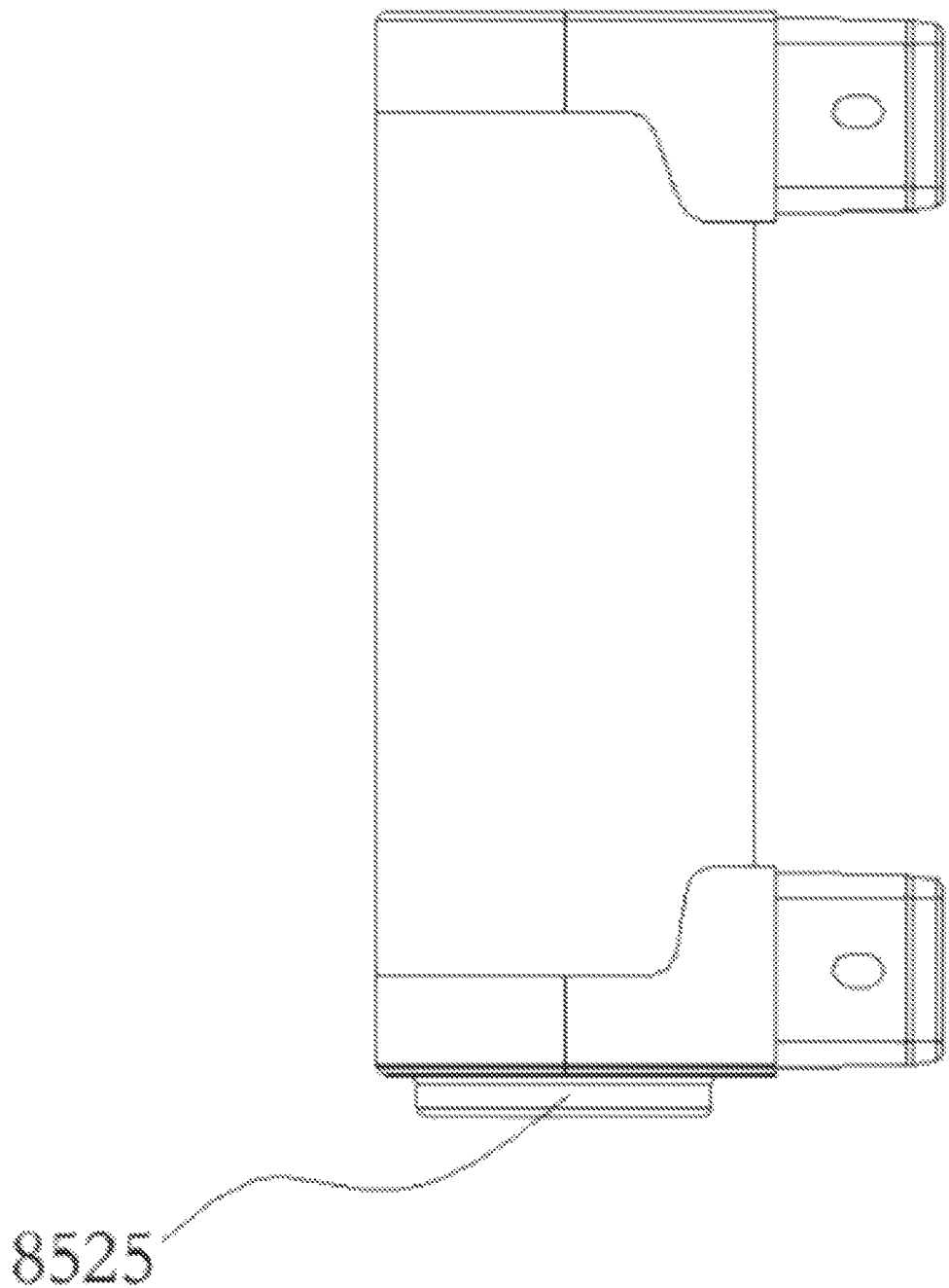
FIG. 8 is a side view illustrating an exemplary first connector in accordance with exemplary embodiments of the present invention.

In some embodiment, first connector 80 is configured to include a means to stabilize the bed frame and to prevent slip of the bed frame when in use. By way of example, FIG. 8 illustrates protrusion 8525 formed or disposed at first lower coupler 852. Protrusion 8525 faces downwardly with respect to the collapsible bed frame when the collapsible bed frame is in an expanded state. Protrusion 8525 creates a gap between frame unit 100 (e.g., lower frame 102) and the ground so that there is no direct contact between frame unit 100 and the ground. It also reduces the contacting area between the collapsible bed frame and the ground, and thus increases the pressure and friction between first lower coupler 852 of first connector 80 and the ground. This helps to hold first lower coupler 852 of first connector 80 on the ground, and thus prevents the collapsible bed frame from moving or sliding when in use.

In various embodiments, a collapsible bed frame of the present invention includes a plurality of second connectors configured to connect one or more inner lateral bar units with the first and second longitudinal bar units. It should be noted that any two of the second connectors can be the same as or different from each other. In various embodiments, each second connector is configured to connect one end (e.g., the first or second end) of an inner lateral bar unit (e.g., inner lateral bar unit 12) with ends of two first adjacent longitudinal bar units or with ends of two second adjacent longitudinal bar units.

Figure 12:
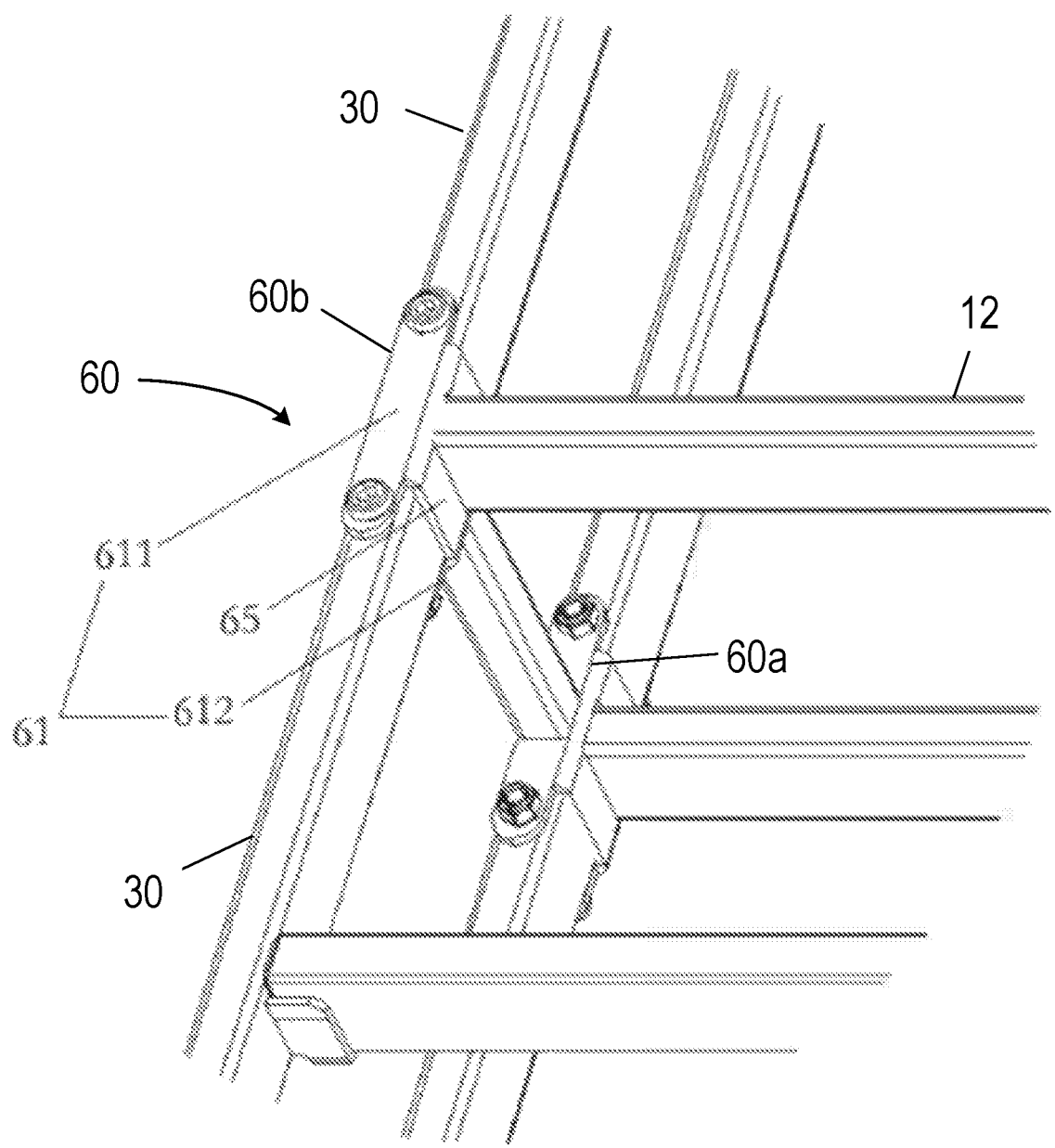
FIG. 12 is an enlarged view taken along circle A of FIG. 1.
Figure 13:
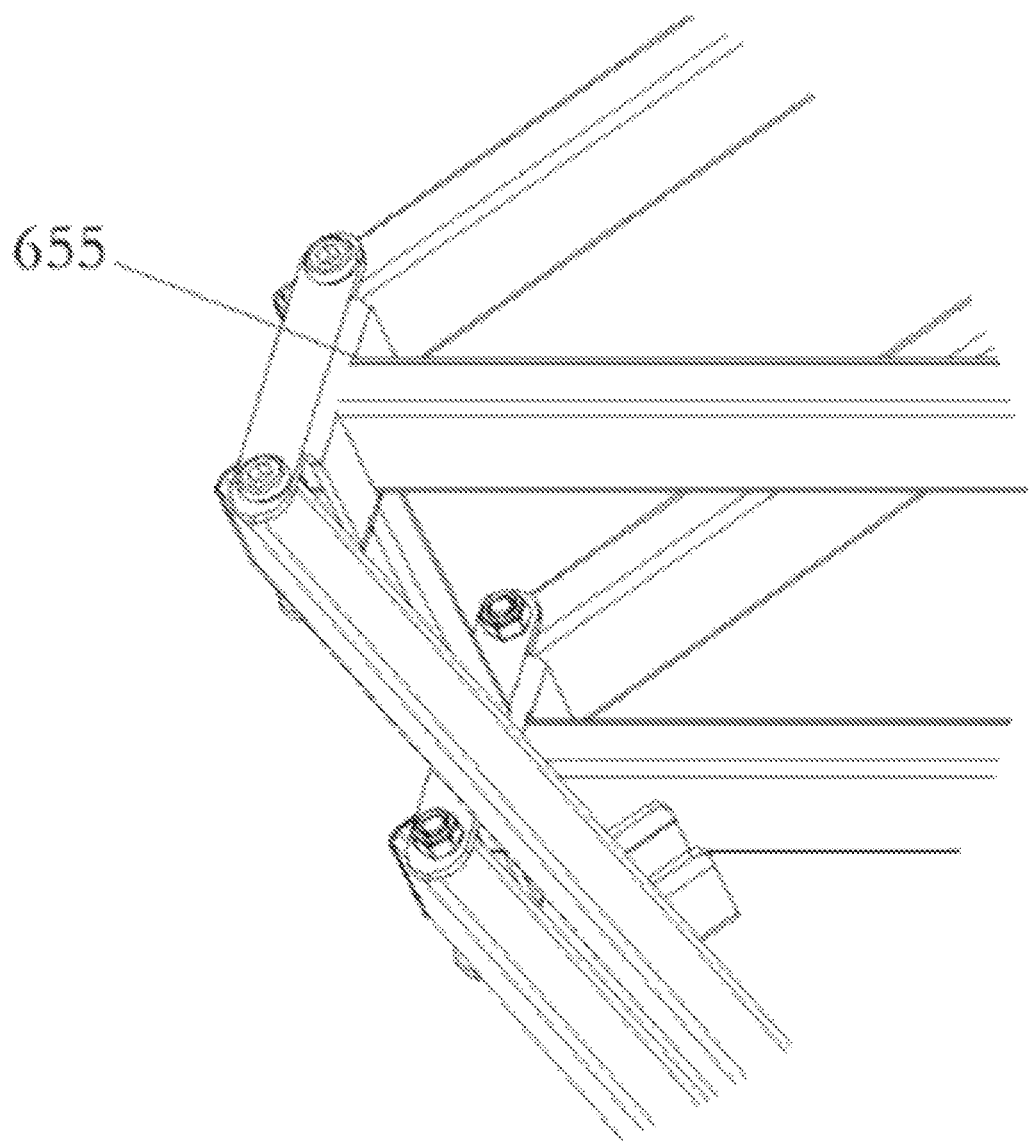
FIG. 13 is an enlarged view taken along circle C of FIG. 4.

An exemplary second connector generally includes a piece for fixedly connecting an inner lateral bar, and a coupling piece for rotatably connecting two first or second adjacent longitudinal bar units. For instance, by way of example, FIGS. 12 and 13 illustrate second connector 60 including first piece 65 for fixedly connecting inner lateral bar 12, and coupling piece 61 for rotatably connecting two adjacent longitudinal bar units 30. In some embodiments, coupling piece 61 includes second piece 611 extended from an upper edge of the first piece and third piece 612 extended from a lower edge of the first piece. The second and third pieces are substantially perpendicular to the first piece. Collectively, the first, second and third pieces form a structure having a substantially "U"-shaped cross section.

The end of the inner lateral bar unit is fixedly coupled with first piece 65, for instance, by welding, or other means. In some embodiments, first piece 65 is formed with a through-hole, such as through-hole 655, to accommodate the end of the inner lateral bar unit. Once the end of the inner lateral bar unit is inserted into through-hole 655, welding can be performed on both sides of first piece 65. This significantly increases the strength of the connection between the inner lateral bar unit and first piece 65 of second connector 60.

Ends of the two adjacent longitudinal bar units are disposed between the second and third pieces and rotatably connected with the second and third pieces, for instance, by bolts and nuts. One longitudinal bar unit is rotatable along a first axis, and the other of the two adjacent longitudinal bar units is rotatable along a second axis. In some embodiments, the first piece is shorter than the second and third pieces in a longitudinal direction of the collapsible bed frame, and the first and second axes are located beyond the first piece in the longitudinal direction of the collapsible bed frame. This allows the two adjacent longitudinal bar units to rotate toward the inner lateral bar unit as illustrated in FIGS. 4 and 13, and thus allows the bed frame to contract. In addition, when the bed frame is expanded, the first piece serves as a stopper to the two adjacent longitudinal bar units as illustrated in FIGS. 1 and 12, and prevents them from rotating beyond the expanded state.

It should be noted that second connector 60 can be a single connector or a stack of connectors. For instance, in some embodiments such as those where an inner lateral bar unit or adjacent longitudinal bar unit is a stack of bars, second connector 60 can includes two, three or more connectors. By way of example, FIGS. 12 and 13 illustrate an exemplary second connector 60 including second lower connector 60*a* and second upper connector 60*b*. Each of second lower connector 60*a* and second upper connector 60*b* includes first piece 65, second piece 611 and third piece 612. Second lower connector 60*a* connects the lower bars of the inner lateral bar unit and its adjacent longitudinal bar units. For instance, an end of the lower bar of the inner lateral bar unit is fixedly connected with the first piece of the second lower connector. The ends of the lower bars of the two adjacent longitudinal bar units are disposed between the second and third pieces and rotatably connected with the second and third pieces of the second lower connector. Similarly, second upper connector 60*b* connects the upper bars of the inner lateral bar unit and its adjacent longitudinal bar units.

Figure 14:
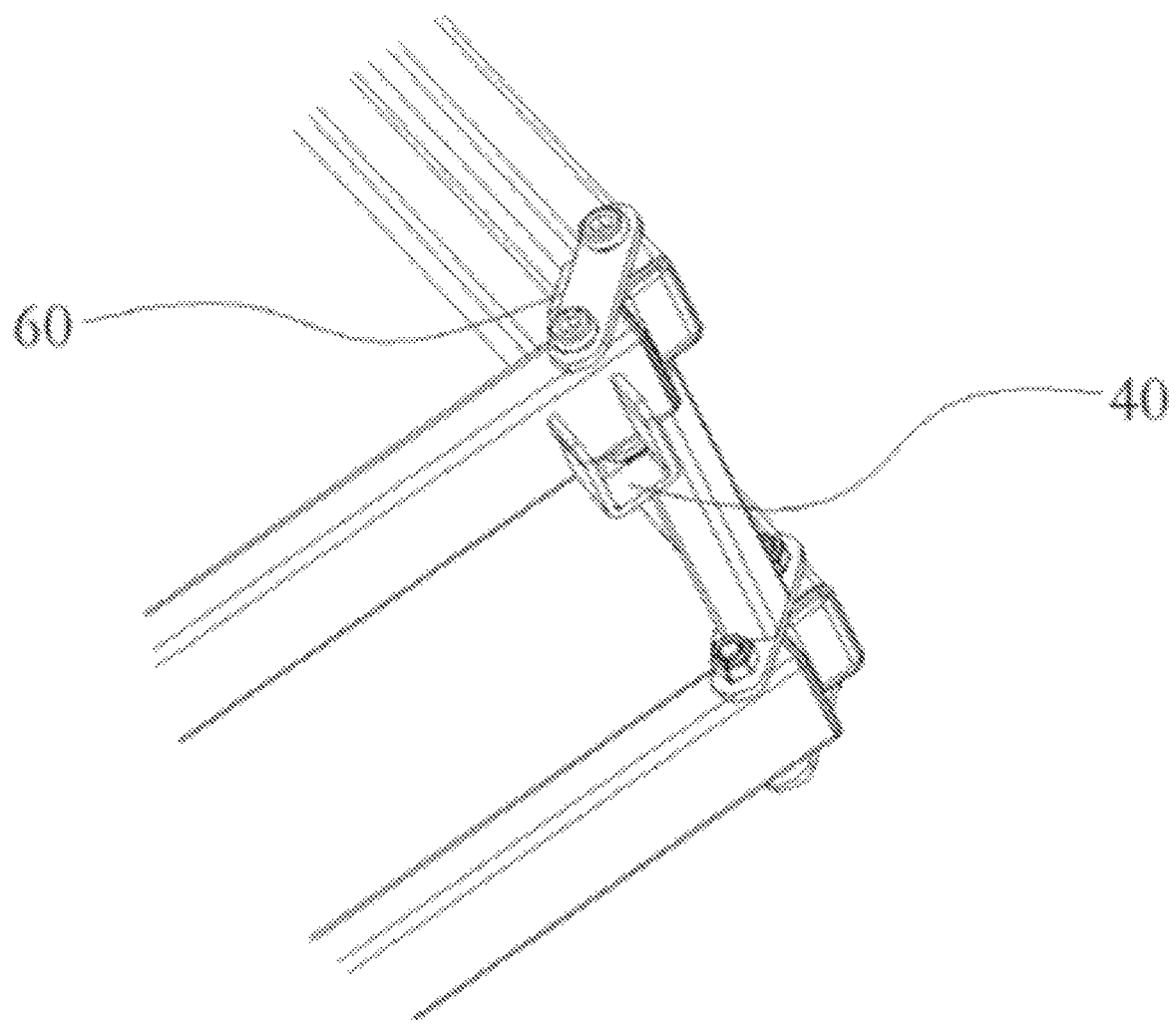
FIG. 14 is an enlarged view taken along circle D of FIG. 4.

In various embodiments, a collapsible bed frame of the present invention includes a plurality of third connectors configured to rotatably connect two adjacent longitudinal segment units, e.g., first longitudinal segment unit 36 and second longitudinal segment unit 37. It should be noted that any two of the third connectors can be the same as or different from each other. In some embodiments, the third connector is substantially the same as second connector 60. For instance, FIG. 14 illustrates the use of second connector 60 (i.e., the third connector being substantially the same as second connector 60) to connect two adjacent longitudinal segment units. In some embodiments, the third connector is different from the second connector. For instance, the third connector can include a first piece similar to first piece 65 but without through-hole 655.

As disclosed herein, the collapsible bed frames of the present invention can contract and expand while the lateral and longitudinal bar units are connected with each other. As such, there is no need to assemble or disassemble these parts, and there is no need to carry tools such as screwdrivers and wrenches. Moreover, the sizes of the collapsible bed frames when contracted are reduced significantly. As such, they require less space for shipping, transportation and storage. Further, with the receptacles, the lateral and longitudinal supporting bar units can be easily installed or removed. As such, using a collapsible bed frame of the present invention to make a comfortable bed is not time consuming and does not require much effort.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first longitudinal bar unit could be termed a second longitudinal bar unit, and, similarly, a second longitudinal bar unit could be termed a first frame, without changing the meaning of the description, so long as all occurrences of the "first longitudinal bar unit" are renamed consistently and all occurrences of the "second longitudinal bar unit" are renamed consistently.

What is claimed is:

1. A collapsible bed frame comprising:
   a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;
   a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame and rotatably connected with the first ends of the two adjacent lateral bar units, and a second longitudinal bar unit in the plurality of second longitudinal bar units is disposed at a second side of the collapsible bed frame and rotatably connected with the second ends of the two adjacent lateral bar units;
   a plurality of first connectors, each comprising a first body and a first coupler rotatable with respect to the first body, wherein the first body is connected with the first or second end of a respective outer lateral bar unit in the first and second outer lateral bar units, and the first coupler is connected with an end of a corresponding first or second longitudinal bar unit; and
   a plurality of second connectors, each connected with the first or second end of a respective inner lateral bar unit in the at least one inner lateral bar unit and connected with ends of two adjacent longitudinal bar units in the plurality of first longitudinal bar units or in the plurality of second longitudinal bar units,
   wherein each second connector comprises a first piece fixedly coupled with the first or second end of the respective inner lateral bar, wherein the first piece is formed with a through-hole to receive the first or second end of the respective inner lateral bar unit, thereby increasing a strength of the connection between the first piece and the first or second end of the respective inner lateral bar unit;
   wherein one or more receptacles are formed or disposed at each bar unit in the plurality of lateral bar units, the plurality of first longitudinal bar units, and the plurality of second longitudinal bar units and configured to removably receive one or more supporting bar units.

2. The collapsible bed frame of claim 1, wherein between the respective outer lateral bar unit and its adjacent inner lateral bar unit:
   each of the first and second longitudinal bar units comprises a first longitudinal segment unit and a second longitudinal segment unit rotatably connected with each other at one ends thereof, wherein the other end of the first longitudinal segment unit is connected with the first coupler of the corresponding first connector at the respective outer lateral bar unit, and the other end of the second longitudinal segment unit is connected with the adjacent inner lateral bar unit.

3. The collapsible bed frame of claim 2, wherein the first body has a substantially cylindrical shape, and the first coupler comprises a first part rotatably coupled with the first body and a second part connected with the other end of the first longitudinal segment unit.

4. The collapsible bed frame of claim 3, wherein the first part is formed with a first through-hole, wherein the first part of the first coupler is coupled with the first body by a first fastener through the first through-hole.

5. The collapsible bed frame of claim 3, wherein the second part of the first coupler is formed with a second through-hole configured to couple with the other end of the first or second longitudinal segment unit.

6. The collapsible bed frame of claim 1, wherein:
   each bar unit in the plurality of lateral bar units, the plurality of first longitudinal bar units, and the plurality of second longitudinal bar units comprises an upper bar and a lower bar;
   the upper bars of the plurality of lateral bar units, the plurality of first longitudinal bar units, and the plurality of second longitudinal bar units collectively form an upper frame of the collapsible bed frame; and
   the lower bars of the plurality of lateral bar units, the plurality of first longitudinal bar units, and the plurality of second longitudinal bar units collectively form a lower frame of the collapsible bed frame.

7. The collapsible bed frame of claim 6, wherein the first coupler comprises a first upper coupler disposed at an upper portion of the first body and a first lower coupler disposed at a lower portion of the first body, wherein the first upper coupler is connected with the upper bar of the corresponding first or second longitudinal bar unit, and the first lower coupler is connected with the lower bar of the corresponding first or second longitudinal bar unit.

8. The collapsible bed frame of claim 7, wherein the first lower coupler comprises a protrusion facing downwardly with respect to the collapsible bed frame when the collapsible bed frame is in an expanded state.

9. The collapsible bed frame of claim 7, wherein the first upper and lower couplers are coupled with the first body by one or more fasteners.

10. The collapsible bed frame of claim 6, further comprising a plurality of vertical supporting bars disposed between the upper and lower frames, each having an upper end connected with the upper frame and a lower end connected with the lower frame.

11. A collapsible bed frame comprising:
   a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;
   a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame, and a second longitudinal bar unit in the plurality of second longitudinal bar units is disposed at a second side of the collapsible bed frame;
   a plurality of first connectors, each comprising a first body and a first coupler rotatable with respect to the first body, wherein the first body is connected with the first or second end of a respective outer lateral bar unit in the first and second outer lateral bar units, and the first coupler is connected with an end of an adjacent longitudinal bar unit in the plurality of first and second longitudinal bar units; and
   a plurality of second connectors, each connected with the first or second end of a respective inner lateral bar unit in the at least one inner lateral bar unit and connected with ends of two adjacent longitudinal bar units in the plurality of first longitudinal bar units or in the plurality of second longitudinal bar units,
   wherein each second connector comprises a first piece fixedly coupled with the first or second end of the respective inner lateral bar, wherein the first piece is formed with a through-hole to receive the first or second end of the respective inner lateral bar unit, thereby increasing a strength of the connection between the first piece and the first or second end of the respective inner lateral bar unit.

12. The collapsible bed frame of claim 11, wherein between the respective outer lateral bar unit and its adjacent inner lateral bar unit:
   each of the first and second longitudinal bar units comprises a first longitudinal segment unit and a second longitudinal segment unit rotatably connected with each other at one ends thereof, wherein the other end of the first longitudinal segment unit is connected with the first coupler of the corresponding first connector at the respective outer lateral bar unit, and the other end of the second longitudinal segment unit is connected with the adjacent inner lateral bar unit.

13. The collapsible bed frame of claim 12, wherein the first and second longitudinal segment units are rotatably connected with each other by a third connector.

14. The collapsible bed frame of claim 13, wherein each of the first and second longitudinal segment units comprises an upper bar segment and a lower bar segment, wherein the third connector comprises a third upper connector to connect the upper bar segments of the first and second longitudinal segment units and a third lower connector to connect the lower bar segments of the first and second longitudinal segment units.

15. The collapsible bed frame of claim 11, wherein each second connector further comprises:
   a second piece extended from an upper edge of the first piece and substantially perpendicular to the first piece; and
   a third piece extended from a lower edge of the first piece and substantially perpendicular to the first piece;
   wherein:
   the ends of the two adjacent first or second longitudinal bar units are disposed between the second and third pieces and rotatably connected with the second and third pieces, wherein one of the two adjacent longitudinal bar units is rotatable along a first axis, and the other of the two adjacent longitudinal bar units is rotatable along a second axis;
   the first piece is shorter than the second and third pieces in a longitudinal direction of the collapsible bed frame; and
   the first and second axes are located beyond the first piece in the longitudinal direction of the collapsible bed frame, thereby allowing the two adjacent longitudinal bar units to rotate toward the respective inner lateral bar unit.

16. The collapsible bed frame of claim 11, wherein between each of two adjacent lateral bar units, the first longitudinal bar unit in the plurality of first longitudinal bar units is rotatably connected with the first ends of the two adjacent lateral bar units, and the second longitudinal bar unit in the plurality of second longitudinal bar units is rotatably connected with the second ends of the two adjacent lateral bar units.

17. The collapsible bed frame of claim 11, wherein one or more receptacles are formed or disposed at each bar unit in the plurality of lateral bar units, the plurality of first longitudinal bar units, and the plurality of second longitudinal bar units and configured to removably receive one or more supporting bar units.

18. The collapsible bed frame of claim 11, wherein the first body has a substantially cylindrical shape, and the first coupler comprises a first part rotatably coupled with the first body and a second part connected with the other end of the first longitudinal segment unit.

19. The collapsible bed frame of claim 18, wherein the first part is formed with a first through-hole, wherein the first part of the first coupler is coupled with the first body by a first fastener through the first through-hole.

20. The collapsible bed frame of claim 19, wherein the second part of the first coupler is formed with a second through-hole configured to couple with the other end of the first or second longitudinal segment unit.

21. The collapsible bed frame of claim 18, wherein the second part of the first coupler is formed with a second through-hole configured to couple with the other end of the first or second longitudinal segment unit.

22. The collapsible bed frame of claim 11, wherein the increasing of the strength of the connection between the first piece and the first or second end of the respective inner lateral bar unit is achieved by welding on both sides of the first piece.

23. A collapsible bed frame comprising:
   a plurality of lateral bar units, each arranged substantially parallel to another, each having a first end and a second end, wherein the plurality of lateral bar units comprises a first outer lateral bar unit, a second outer lateral bar unit, and at least one inner lateral bar unit disposed between the first and second outer lateral bar units;
   a plurality of first longitudinal bar units and a plurality of second longitudinal bar units, wherein between each of two adjacent lateral bar units, a first longitudinal bar unit in the plurality of first longitudinal bar units is disposed at a first side of the collapsible bed frame, and a second longitudinal bar unit in the plurality of second longitudinal bar units is disposed at a second side of the collapsible bed frame;
   a plurality of first connectors, each comprising a first body and a first coupler rotatable with respect to the first body, wherein the first body is connected with the first or second end of a respective outer lateral bar unit in the first and second outer lateral bar units, and the first coupler is connected with an end of an adjacent longitudinal bar unit in the plurality of first and second longitudinal bar units; and
   a plurality of second connectors, each connected with the first or second end of a respective inner lateral bar unit in the at least one inner lateral bar unit and connected with ends of two adjacent longitudinal bar units in the plurality of first longitudinal bar units or in the plurality of second longitudinal bar units,
   wherein:
   each bar unit in the plurality of lateral bar units, the plurality of first longitudinal bar units, and the plurality of second longitudinal bar units comprises an upper bar and a lower bar;
   the upper bars of the plurality of lateral bar units, the plurality of first longitudinal bar units, and the plurality of second longitudinal bar units collectively form an upper frame of the collapsible bed frame;
   the lower bars of the plurality of lateral bar units, the plurality of first longitudinal bar units, and the plurality of second longitudinal bar units collectively form a lower frame of the collapsible bed frame;
   each second connector comprises a second upper connector for connecting upper bars and a second lower connector for connecting lower bars; and
   each of the second upper and lower connectors comprises a first piece fixedly coupled with the first or second end of the lower or upper bar of the respective inner lateral bar unit, wherein the first piece is formed with a through-hole to receive the first or second end of the lower or upper bar of the respective inner lateral bar unit, thereby increasing a strength of the connection between the first piece and the first or second end of the lower or upper bar of the respective inner lateral bar unit.

24. The collapsible bed frame of claim 23, wherein the first coupler comprises a first upper coupler disposed at an upper portion of the first body and a first lower coupler disposed at a lower portion of the first body, wherein the first upper coupler is connected with the upper bar of the corresponding first or second longitudinal bar unit, and the first lower coupler is connected with the lower bar of the corresponding first or second longitudinal bar unit.

25. The collapsible bed frame of claim 24, wherein the first lower coupler comprises a protrusion facing downwardly with respect to the collapsible bed frame when the collapsible bed frame is in an expanded state.

26. The collapsible bed frame of claim 25, wherein the first upper and lower couplers are coupled with the first body by one or more fasteners.

27. The collapsible bed frame of claim 24, wherein the first upper and lower couplers are coupled with the first body by one or more fasteners.

28. The collapsible bed frame of claim 23, wherein each of the second upper and lower connectors further comprises:
   a second piece extended from an upper edge of the first piece and substantially perpendicular to the first piece; and
   a third piece extended from a lower edge of the first piece and substantially perpendicular to the first piece;
   wherein
   the ends of the lower or upper bars of the two adjacent first or second longitudinal bar units are disposed between the second and third pieces and rotatably connected with the second and third pieces, wherein one of the two adjacent longitudinal bar units is rotatable along a first axis, and the other of the two adjacent longitudinal bar units is rotatable along a second axis;
   the first piece has a length shorter than the second and third pieces in a longitudinal direction of the collapsible bed frame; and
   the first and second axes are located beyond the first piece in the longitudinal direction of the collapsible bed frame, thereby allowing the two adjacent longitudinal bar units to rotate toward the respective inner lateral bar unit.

29. The collapsible bed frame of claim 23, further comprising a plurality of vertical supporting bars disposed between the upper and lower frames, each having an upper end connected with the upper frame and a lower end connected with the lower frame.

30. The collapsible bed frame of claim 23, wherein the increasing of the strength of the connection between the first piece and the first or second end of the lower or upper bar of the respective inner lateral bar unit is achieved by welding on both sides of the first piece.

* * * * *